United States Patent
Kanda

(10) Patent No.: US 7,649,815 B2
(45) Date of Patent: Jan. 19, 2010

(54) REPETITIVE CONTROL DEVICE AND OPTICAL DISC DEVICE

(75) Inventor: Yoshihiro Kanda, Osaka (JP)

(73) Assignee: Panasonic Corporation, Osaka (JP)

( * ) Notice: Subject to any disclaimer, the term of this patent is extended or adjusted under 35 U.S.C. 154(b) by 301 days.

(21) Appl. No.: 10/586,355

(22) PCT Filed: Jan. 14, 2005

(86) PCT No.: PCT/JP2005/000339
§ 371 (c)(1),
(2), (4) Date: Jul. 17, 2006

(87) PCT Pub. No.: WO2005/069285
PCT Pub. Date: Jul. 28, 2005

(65) Prior Publication Data
US 2007/0159939 A1    Jul. 12, 2007

(30) Foreign Application Priority Data
Jan. 16, 2004    (JP)    ............................ 2004-008917

(51) Int. Cl.
*G11B 7/00* (2006.01)
(52) U.S. Cl. .................................. 369/44.29
(58) Field of Classification Search ........................ None
See application file for complete search history.

(56) References Cited

U.S. PATENT DOCUMENTS

| 5,790,492 | A  | * | 8/1998 | Umezawa et al. | ......... 369/53.33 |
| 6,567,357 | B2 | * | 5/2003 | Kishimoto et al. | ....... 369/53.14 |
| 6,683,833 | B2 | * | 1/2004 | Dekker et al. | ............ 369/44.29 |

FOREIGN PATENT DOCUMENTS

| JP | 1-140432   |   | 6/1989 |
| JP | 1-140432   | A | 6/1989 |
| JP | 3-194736   |   | 8/1991 |
| JP | 3-194736   | A | 8/1991 |
| JP | 9-50303    |   | 2/1997 |
| JP | 9-50303    | A | 2/1997 |
| JP | 10-134380  |   | 5/1998 |
| JP | 10-134380  | A | 5/1998 |

\* cited by examiner

*Primary Examiner*—Peter Vincent Agustin
(74) *Attorney, Agent, or Firm*—McDermott Will & Emery LLP

(57) ABSTRACT

In a repetitive control device used for processing a servo signal, a memory (7) is used as a delay element for a filter (6), and a filtering process by the filter (6) is carried out using a clock signal that is an integral multiple of an operation frequency of a driving signal. Therefore, the gain can be increased without generating phase rotation with respect to a compensated signal, and high followability can be achieved to fluctuations in the track position which are caused by the shape of a disc such as decentering or surface wobbling, during recording and playback in an optical disc device.

8 Claims, 10 Drawing Sheets

REPETITIVE CONTROL DEVICE AND OPTICAL DISC DEVICE

RELATED APPLICATION

This application is a national phase of PCT/JP2005/000339 filed on Jan. 14, 2005, which claims priority from Japanese Application No. 2004-008917 filed on Jan. 16, 2004, the disclosures of which Applications are incorporated by reference herein. The benefit of the filing and priority dates of the International and Japanese Applications is respectfully requested.

TECHNICAL FIELD

The present invention relates to an optical disc device using a repetitive control device.

BACKGROUND ART

With advances in speedup and density growth of optical disc devices, an optical servo for maintaining a focal point of a laser beam on an information recording track is rapidly desired to improve its precision. Especially, with speedup of an optical disc device, fluctuation in the track position that is synchronized with disc rotation, such as decentering or surface wobbling of an optical disc, increase more and more, and therefore, development of an optical disc device that can follow the fluctuation is demanded.

However, since a servo signal has a characteristic that only its frequency increases with its amplitude being maintained as the rpm of the disc increases, a higher loop gain is required to maintain a servo residual error at a specified value or lower. On the other hand, increasing the loop gain has a limitation due to a restriction such as secondary resonance of a pickup, and consequently, followability is undesirably degraded.

So, as a technique for securing the followability, a repetitive control device as disclosed in Japanese Published Patent Application No. Hei. 9-50303 (Patent Document 1) has attracted attention.

FIG. 8 is a block diagram for explaining a servo signal processing of a conventional optical disc device.

In FIG. 8, a servo signal processing system of the conventional optical disc device comprises an adder 0, a servo filter 1, an adder 2, a DAC 3, a driver 4, a pickup 5, a filter 6, a memory 7, a memory controller 8, a rotation angle detector 9, and a gain 10. A repetitive control device 20 comprises the adder 2, the filter 6, the memory 7, and the gain 10 as shown in FIG. 8.

The adder 0 detects a positional error of a focal point of a light beam with respect to a track position, and outputs a detected signal as a servo error signal to the servo filter 1. The servo filter 1 performs PID control filtering or the like on the inputted servo error signal, and outputs a generated compensation signal S3 to the repetitive control device 20.

The adder 2 adds an output S2 from the gain 10 to the output S3 from the servo filter 1 to generate a driving signal S1. The DAC 3 is a DA converter which converts the driving signal S1 outputted from the adder 2 into an analog signal. The driver 4 receives the output of the DAC 3, and generates an actuator driving current. The pickup 5 is controlled on the basis of the actuator driving signal, and moves the position of a lens to move the position of the focal point of the light beam on the optical disc.

The filter 6 is a filter of the repetitive control device 20, and generates a signal of a predetermined frequency band, which performs repetitive control. The filter 6 comprises a low-pass filter for removing noises and signals that exceed the control bandwidth of the repetitive control device 20 from the signal outputted from the adder 2, and a high-pass filter for removing DC components.

The memory 7 has plural memory areas, and signal information for one rotation of the disc is divided to be stored in the respective memory areas. The memory controller 8 changes the address of the memory 7 on the basis of an operation timing signal outputted from the rotation angle detector 9, and sends the contents of the selected address to the adder 2 as well as stores the output of the filter 6 into the memory area indicated by the address.

The rotation angle detector 9 generates a clock signal having a frequency that is phase-synchronized with an inputted spindle FG signal and is equal to an integral multiple of the spindle FG signal, and outputs the clock signal as an operation timing signal for memory control.

The gain 10 is a gain element $\beta$ which multiplies the output from the memory 7 by a value not larger than 1 and outputs the resultant to the adder 2, and the gain 10 always multiplies the output of the memory 7 by a value of $\beta \leq 1$ so as to prevent the degree of learning from becoming 100%, thereby to satisfy the stability condition of the repetitive control.

FIG. 9 is a block diagram for explaining the memory 7 of the repetitive control device 20 shown in FIG. 8.

In FIG. 9, an arrow shown beside an optical disc 100 indicates the rotation direction of the optical disc 100, and numerals 1~16 on the optical disc 100 indicate areas obtained by dividing the optical disc 100 into 16 in the circumferential direction.

A pickup 5 traces the tracks on the rotating optical disc 100 in the circumference direction. This is identical to the pickup 5 shown in FIG. 8.

A memory 102 has sixteen memory areas corresponding to the areas 1~16 on the optical disc 100, and corresponding addresses are determined for the respective memory areas. A selector 103 selects one address from among the addresses of the memory 102, and writes the data from the filter 6 into the address, and further, outputs the data read from the address to the adder 2 shown in FIG. 8. The memory 7 shown in FIG. 8 is obtained by combining the memory 102 and the selector 103.

A disc motor 104 rotates the optical disc 100, and outputs an FG pulse from an FG circuit that is provided therein.

A PLL 105 multiplies the FG pulse outputted from the disc motor 104 to generate a clock signal. In FIG. 9, since the optical disc is divided into 16 areas, 16 pulses of clocks are generated for one rotation. A counter 106 counts the clocks generated by the PLL 105 to output counts from 1 to 16. The rotation angle detector 9 shown in FIG. 8 is obtained by combining the PLL 105 and the counter 106.

A memory controller 8 discriminates an area on the optical disc 100 which is currently reproduced by the pickup 101, on the basis of the count output from the counter 106, and sends the corresponding address of the memory 102 to the selector 103. It is identical to the memory controller 8 shown in FIG. 8.

FIG. 10 is a waveform diagram for explaining the manner of data updation of the memory 7. The output of the memory 7 is changed according to the memory address outputted from the memory controller 8, and the output S2 from the memory 7 via the gain 10 and the output S3 from the servo filter 1 are added by the adder 2. Thereafter, the addition result S1 is sent to the DAC 3 and, simultaneously, inputted to the memory 7 via the filter 6.

Since, for simplification, FIG. 10 is drawn with the output S3 of the servo filter 1 being zero, the output S2 of the memory 7 via the gain 10 is equal to the input S1 of the filter 6.

Next, the operation of the conventional optical disc device will be described.

Initially, a description will be given of a servo loop processing to be performed by a servo loop comprising the adder 0, the servo filter 1, the adder 2, the DAC 3, the driver 4, and the pickup 5 shown in FIG. 8.

First of all, on the basis of the position of the focal point of the light beam outputted from the pickup 5 while the pickup 5 traces the track on the rotating optical disc, and the track position that is externally inputted, the adder 0 detects a positional error of the focal point of the light beam with respect to the track position, and inputs the positional error to the servo filter 1.

In the servo filter 1, the inputted positional error signal of the light beam focal point to the track position is subjected to processings such as phase compensation, low-pass compensation and the like. Thereafter, an actuator driving signal that follows track decentering, surface wobbling or the like is outputted from the driver 4 through the servo filter 1, the adder 2, and the DAC 3 to the pickup 5. The position of the pickup 5 is appropriately controlled on the basis of the actuator driving signal outputted from the driver 4, whereby the focal point of the optical beam is maintained on the track.

Next, a description will be given of the processing of the repetitive control device 20 that performs feedforward control for the above-mentioned servo loop processing.

The signal S1 outputted from the adder 2 is input to the filter 6, wherein noises and signals that exceed the control bandwidth of the repetitive control device 20 are removed by the low-pass filter, and simultaneously, the DC components are removed by the high-pass filter.

The signal outputted from the filter 6 is stored in a predetermined address area in the memory 7, under control of the memory controller 8 that operates on the basis of the operation timing signal outputted from the rotation angle detector 9. Simultaneously, the memory controller 8 outputs the data stored in the predetermined address area of the memory 7 to the gain 10, and the signal S2 that is multiplied by a value not larger than 1 by the gain 10 is outputted to the adder 2. In this construction, a signal corresponding to one rotation of the disc, which is restricted to a predetermined frequency band by the filter 6, is stored into the divided plural memory areas of the memory 7, and sequentially outputted from the memory 7.

Thereafter, the output signal S2 from the gain 10 is added to the compensated signal S3 outputted from the servo filter 1, by the adder 2.

During the operation of the repetitive control device 20, the low-pass filter of the filter 6 functions as an anti-alias filter when the driving signal S1 is stored in the memory 7 with the address switching frequency of the memory 7 being a sampling frequency.

As described above, according to the conventional optical disc device provided with the repetitive control device 20, the signal S2 synchronized with the rotation of the disc is supplied as a feedforward signal from the memory 7 through the gain 10, whereby the signal level of the frequency component of the compensated signal S3 outputted from the servo filter 1, which frequency component is synchronized with the disc rotation, can be reduced. This is nothing but a reduction in the level of the servo error signal to be inputted to the servo filter 1, and it means that the followability to the track is enhanced.

Further, with respect to the servo characteristics, as shown in a gain diagram of FIG. 11, the loop gain at a frequency that is an integral multiple of the frequency for one rotation of the disc is increased. As the result, it is possible to enhance the followability of the pickup 5 to the fluctuation in the track position that is caused by the disc shape such as decentering or surface wobbling. FIG. 11 is a diagram illustrating the characteristics of the transfer function G of an element comprising the filter 6 and the memory 7. Among the gain characteristics, a dotted line (1) shows the characteristics of the transfer function G in the case where repetitive control is not carried out while a solid line (2) indicates the characteristics of the transfer function G in the case where repetitive control is carried out.

DISCLOSURE OF THE INVENTION

Problems to be Solved by the Invention

In the above-mentioned conventional structure, however, since phase rotations occur at a frequency near the cutoff frequency of the high-pass filter of the filter 6 and at a frequency near the cutoff frequency of the low-pass filter (refer to the phase diagram shown in FIG. 11), the above-mentioned servo performance enhancement effect cannot be sufficiently achieved.

This problem causes a reduction in the effect against partial decentering or partial surface wobbling having a high frequency component, which occurs during high-speed recording and playback, resulting in a reduction in the followability during high-speed recording and playback.

The present invention is made to solve the above-described problems and has for its object to provide a repetitive control device that prevents phase rotation from occurring during a filtering process, and particularly, that achieves high followability against partial decentering or partial surface wobbling having a high frequency component.

Measures to Solve the Problems

In order to solve the above-mentioned problems, a repetitive control device defined in Claim 1 of the present invention comprises an adder to which a compensated signal is inputted; and a feedback signal system for sequentially updating and storing an output signal from the adder as a compensation signal, and outputting the signal to the adder; and the feedback signal system comprises a filter which has, as a delay element, a memory which stores signal information for one rotation of a disc into divided plural memory areas of the memory, and a gain element which multiplies an output from the filter by a value not larger than 1, and inputs the resultant to the adder, and the filter is operated using a clock signal that is equal to an operation frequency of a driving signal or a divided frequency thereof. Therefore, it is possible to prevent aliasing noises by performing band restriction with the filter, and the compensation gain at a frequency equal to an integral multiple of the frequency for one rotation of the disk to a higher frequency band, without generating phase rotation of the compensation signal with respect to the above-mentioned compensated signal, thereby achieving higher followability to fluctuations in the track position which are caused by the shape of a disc, such as decentering and surface wobbling. Further, since a memory for a filter delay processing, which has conventionally been needed, is dispensed with, the circuit scale is reduced.

Further, according to Claim 2 of the present invention, in the repetitive control device defined in Claim 1, the filter has a register connected in parallel with the memory, and records higher-order bit data of an input signal in the memory while records lower-order bit data in the register, during a filtering process by the filter. Therefore, the circuit scale of the memory is reduced, and further, the filter operation is stabilized, and the arithmetic precision is maintained.

Further, according to Claim 3 of the present invention, in the repetitive control device defined in Claim 2, a word length of the higher-order bit data recorded in the memory is equal to a word length of data of the compensated signal that is added in the adder, or to a word length of a DA converter to which the output of the adder is inputted. Therefore, the circuit scale of the memory is reduced to the minimum, and further, the filter operation is stabilized, and the arithmetic precision is maintained. Further, according to Claim 4 of the present invention, in the repetitive control device defined in Claim 1 or 2, the filter includes a low-pass filter, and uses said memory as a delay element for the low-pass filter.

Further, according to Claim 5 of the present invention, in the repetitive control device defined in Claim 1 or 2, the filter is a band-pass filter comprising a low-pass filter and a high-pass filter, and uses said memory as a delay element for the low-pass filter.

Further, a repetitive control device defined in Claim 6 of the present invention comprises an adder to which a servo error signal is inputted; an integral gain for multiplying an output from the adder by a predetermined value; and a feedback signal system for sequentially updating an output signal from the adder and inputting the signal to the adder; and the feedback signal system comprises a memory in which signal information for one rotation of a disc is divided to be stored in plural memory areas, and a gain element which multiplies an output from the memory by a value not larger than 1, and inputs the resultant to the adder, and when performing an integral operation to the inputted servo error signal, the integral operation uses the memory as a delay element for the input signal. Therefore, the gain at the frequency synchronized with the rpm of the disc in the servo error signal is made equal to the DC gain in the integral term without generating a phase delay, after realizing the removal of aliasing noises and the integration process simultaneously, whereby a PID filter having a high low-pass gain can be realized without adversely affecting the servo characteristics.

Further, according to Claim 7 of the present invention, there is provided an optical disc device performing recording or playback of an optical disc, which is equipped with a repetitive control device as defined in Claim 1. Therefore, it is possible to achieve high followability to fluctuations in the track position that is caused by the shape of a disc, such as decentering and surface wobbling.

Further, according to Claim 8 of the present invention, there is provided an optical disc device performing recording or playback of an optical disc, which is equipped with a repetitive control device as defined in Claim 6. Therefore, it is possible to achieve high followability to fluctuations in the track position that is caused by the shape of a disc, such as decentering and surface wobbling.

EFFECTS OF THE INVENTION

A repetitive control device according to the present invention is provided with an adder to which a compensated signal is inputted, and a feedback signal system for sequentially updating and storing an output signal from the adder and outputting the signal to the adder as a compensation signal, and a memory in which signal information for one rotation of a disc is divided to be stored in plural memory areas is used as a delay element of a filter constituting the feed back signal system, and further, filtering is carried out using a clock signal that is equal to an operation frequency of a driving signal or a divided frequency thereof. Therefore, with respect to a frequency component that is synchronized with the rpm, a signal having no phase shift can be recorded into the memory and outputted while preventing aliasing noises by performing band restriction, thereby achieving high followability, up to a higher frequency band, to fluctuations in the track position that are caused by the shape of the disc such as decentering and surface wobbling.

Further, since a memory for filter delay processing, which has conventionally been needed, can be dispensed with, the circuit scale can be reduced.

Further, according to the repetitive control device of the present invention, the filter includes a register which is connected in parallel with the memory, and higher-order bit data of the input signal are recorded in the memory while lower-order bit data are recorded in the register, during the filter processing. Therefore, the circuit scale can be reduced to the minimum, and further, the filter operation can be stabilized, and the arithmetic precision can be maintained.

Further, according to the repetitive control device of the present invention, an integral operation processing to be performed by a differential term operation part of a servo filter is carried out using a memory in which signal information for one rotation of the disc is divided to be stored in plural memory areas. Therefore, the gain at the frequency synchronized with the rpm of the disc in the servo error signal can be made equal to the DC gain in the integral term, whereby effects equivalent to those obtained when a repetitive control device is added to an ordinary servo filter circuit can be obtained with smaller circuit scale.

DESCRIPTION OF THE REFERENCE NUMERALS

Figure 1:
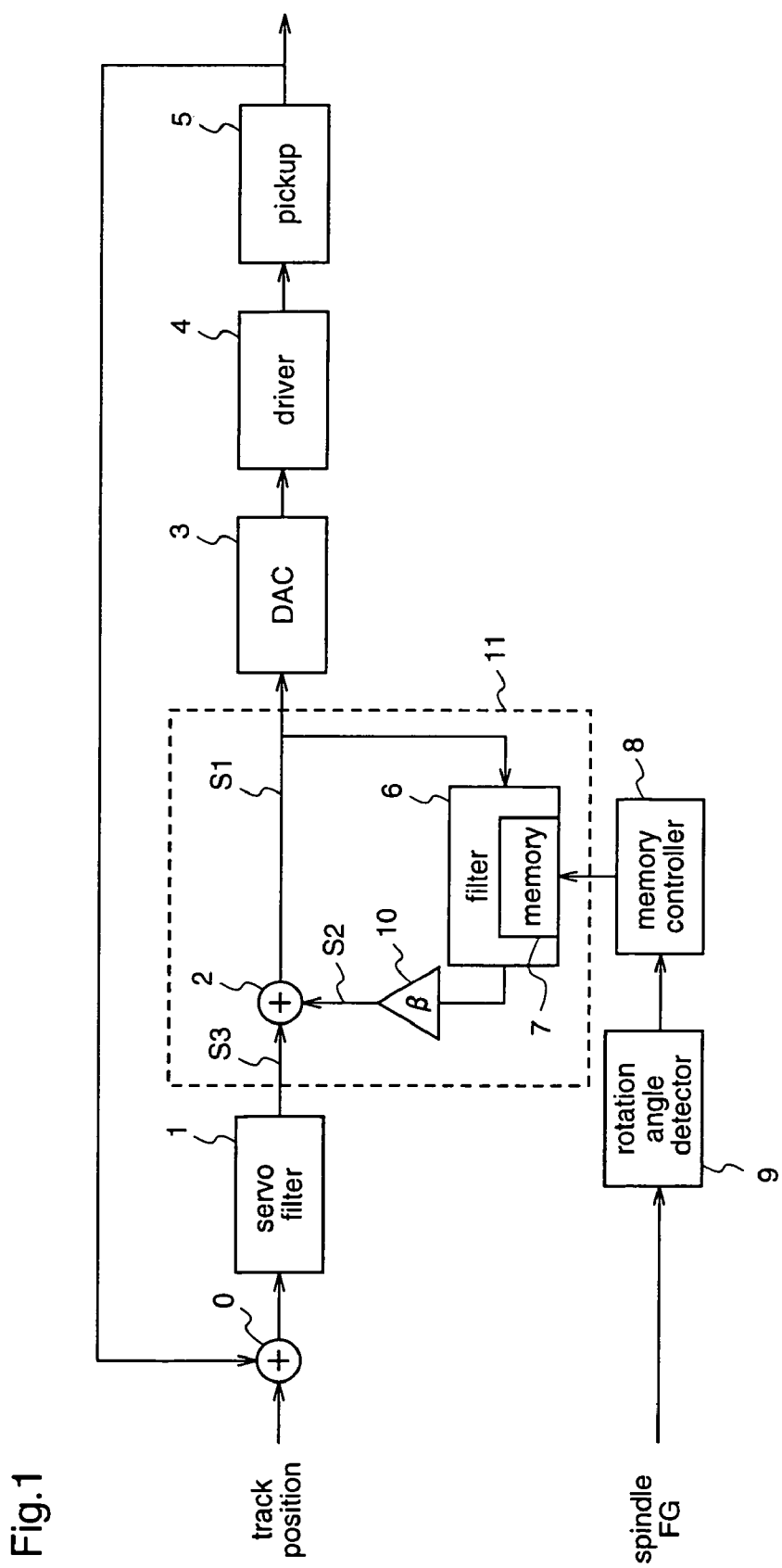
FIG. 1 is a block diagram for explaining a servo signal processing of an optical disc device according to a first embodiment of the present invention.

0 ... adder
1,41 ... servo filter
2 ... adder
3 ... DA converter
4 ... driver
5 ... pickup
6 ... filter
7 ... memory
8 ... memory controller
9 ... rotation angle detector
10 ... gain
11,20 ... repetitive control device
21,31 ... high-pass filter
22,32 ... low-pass filter
23,33 ... adder
24,34 ... feedback gain
41a ... differential term operation part
41b ... proportional term operation part
41c ... integral term operation part
41d,41e ... adder

BEST MODE TO EXECUTE THE INVENTION

Embodiment 1

Hereinafter, a repetitive control device according to a first embodiment of the present invention will be described.

FIG. 1 is a block diagram for explaining a servo signal processing of an optical disc device according to the first embodiment of the present invention.

In FIG. 1, the optical disc device according to the first embodiment comprises an adder 0, a servo filter 1, an adder 2, a DAC 3, a driver 4, a pickup 5, a filter 6, a memory 7, a memory controller 8, a rotation angle detector 9, and a gain 10. Although the respective constituents are identical to those of the conventional optical disc device shown in FIG. 8, this first embodiment is different from the conventional optical disc device in that the memory 7 of the repetitive control device 11 serves as a delay element for the filter 6, and further, the operation frequency of the memory 7 is not equal to the memory address switching frequency but equal to the operation frequency of the driving signal or a division frequency thereof.

Figure 2:
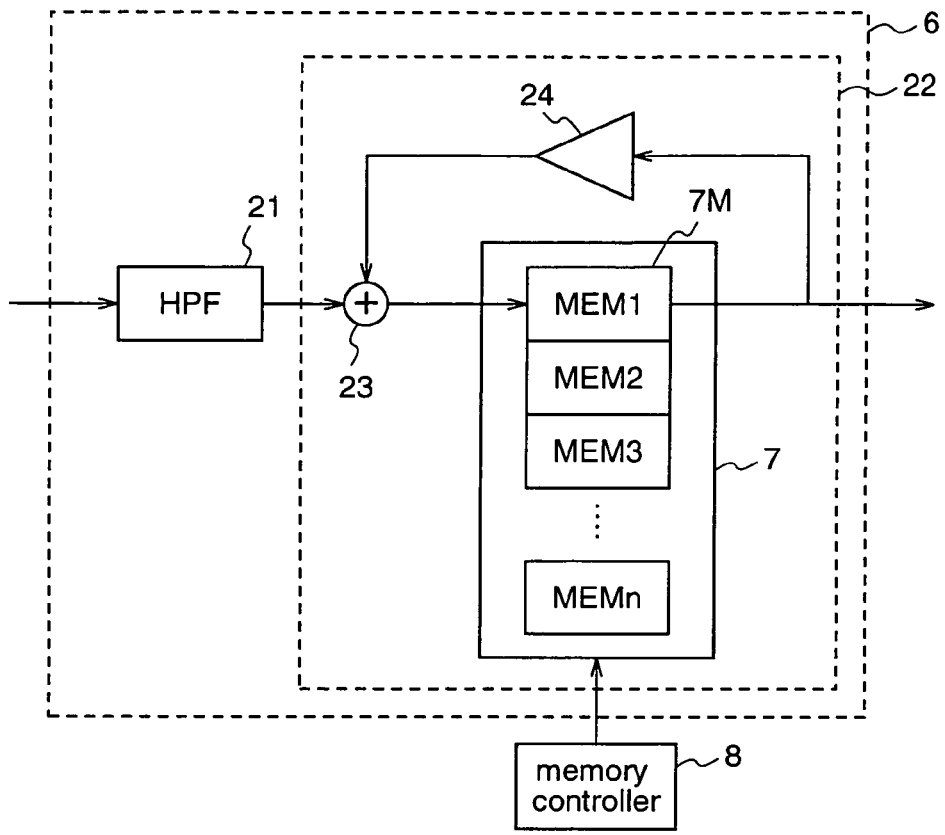
FIG. 2 is a block diagram illustrating the construction of a filter which has, as a delay element, a memory of a repetitive control device according to the first embodiment of the invention.

FIG. 2 is a block diagram illustrating, in detail, a part where the memory 7 is a constituent of the filter 6. In FIG. 2, the filter 6 comprises a high-pass filter 21 and a low-pass filter 22, and the memory 7 is used as a delay element for the low-pass filter 22.

In FIG. 2, the high-pass filter 21 removes DC components. An adder 23, the memory 7, and a feedback gain 24 constitute the low-pass filter 22, and the low-pass filter 22 removes noises and signals that exceed the control bandwidth of the repetitive controller 11. In the memory 7, 7M indicates a memory area (hereinafter referred to as a memory cell) which is currently selected by address control of the memory controller 8, and data writing and reading are performed to this memory cell 7M.

Next, the operation of the repetitive control device 11 according to the first embodiment will be described.

The driving signal to be transferred from the servo filter 1 through the adder 2 to the DA converter 3 passes through the high-pass filter 21 shown in FIG. 2 wherein DC components thereof are removed, and thereafter, the driving signal is input to the low-pass filter comprising the memory cell 7M, the adder 23, and the feedback gain 24. Then, noises and signals that exceed the control bandwidth of the repetitive control device 11 are removed from the driving signal by the low-pass filter 22, and then the signal is added to the output of the servo filter 1 to be transferred to the DA converter 3 as a driving signal.

In the present invention, since these processings are carried out with a frequency equal to the operation frequency of the driving signal or a division frequency thereof, several tens to several hundreds times of the processings are repeatedly carried out to the memory 7M until the address of the memory 7 is changed by the memory controller 8. As the result, an average of the driving signals outputted after the memory cell 7M is selected is written into the memory cell 7M.

Upon switching of the address of the memory 7 under the control of the memory controller 8, the contents of the memory cell 7M are held, and stored while another memory cell is being addressed. Thereby, driving signal data at that point in time corresponding to the rotation angle of the disc is stored in each cell of the memory 7 without a phase shift.

Next, the processing performed by the repetitive control device 11 of the first embodiment will be described in more detail with reference to FIGS. 3 and 4.

FIG. 3 is a waveform diagram for explaining the operation of the repetitive control device 1 according to the first embodiment.

Figure 3A:
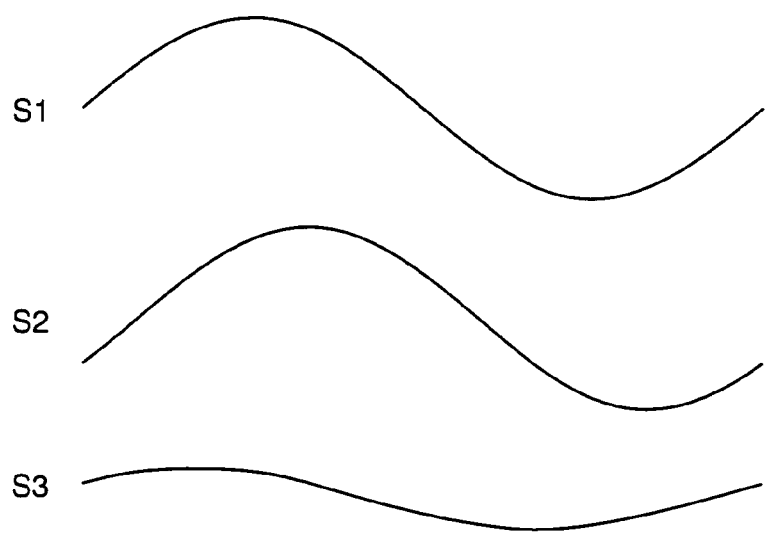
FIG. 3(a) is a diagram illustrating waveforms of output signals S1~S3 in a conventional repetitive control device.
Figure 3B:
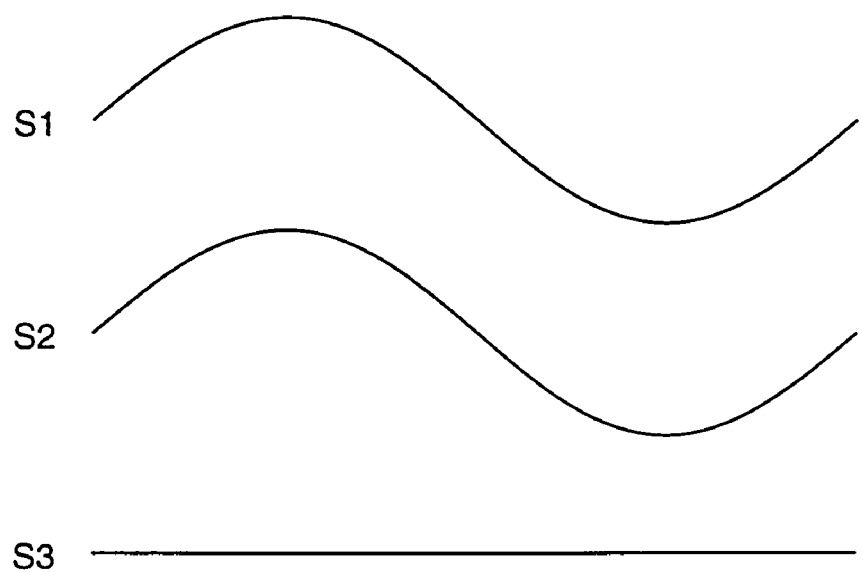
FIG. 3(b) is a diagram illustrating waveforms of output signals S1~S3 in a repetitive control device according to the first embodiment of the present invention.
Figure 8:
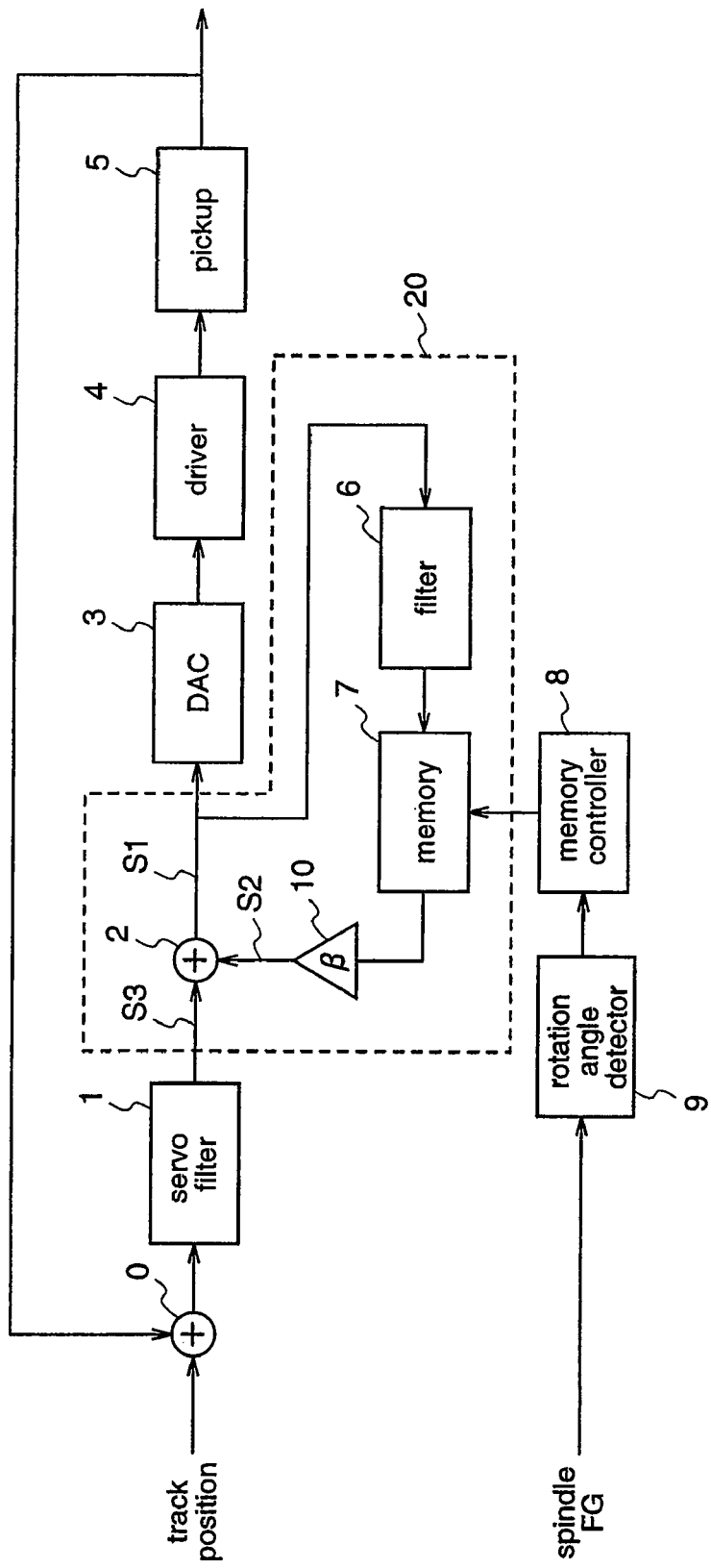
FIG. 8 is a block diagram for explaining a servo signal processing of the conventional optical disc device.
Figure 9:
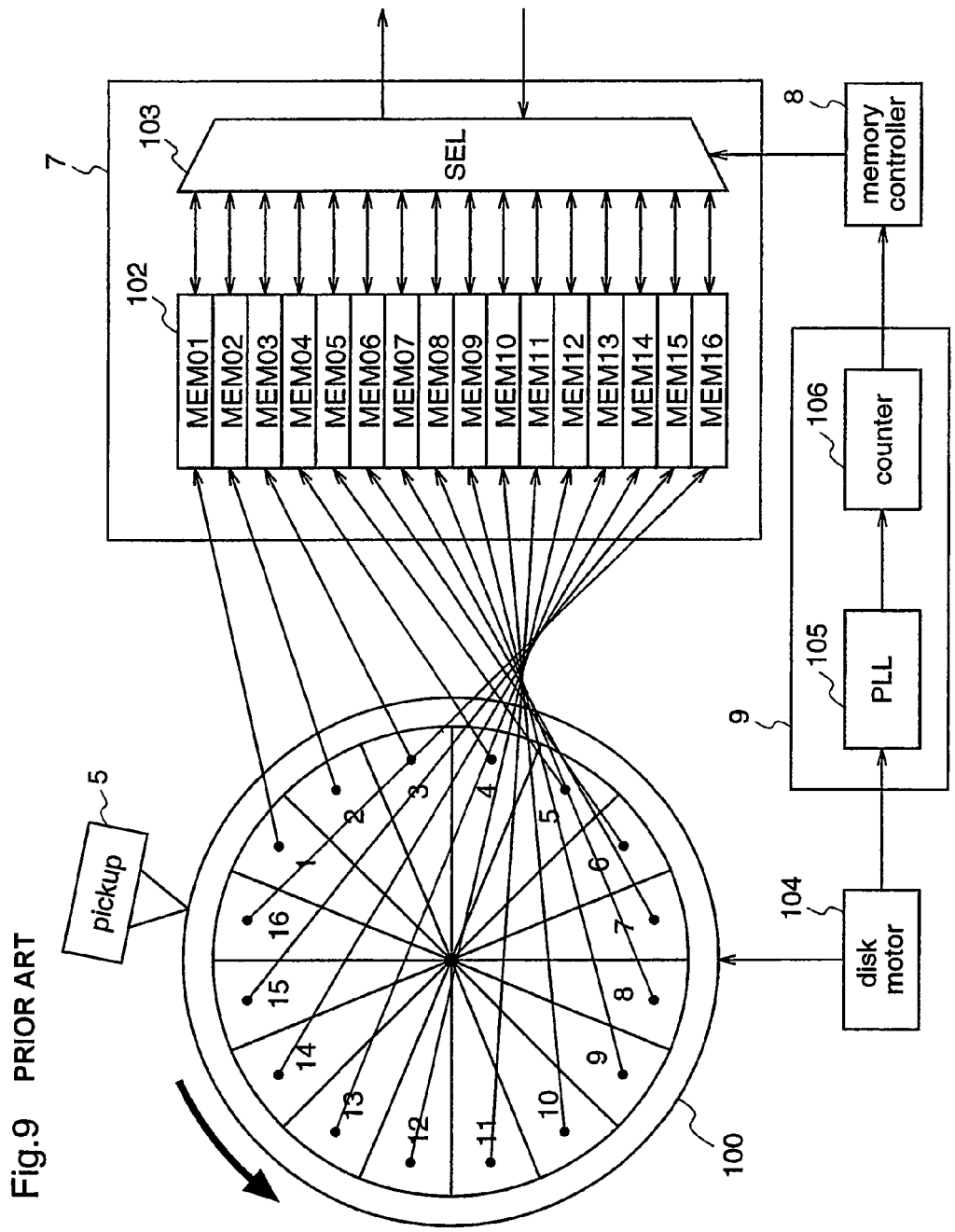
FIG. 9 is a block diagram for explaining a memory of the conventional optical disc device.
Figure 10:
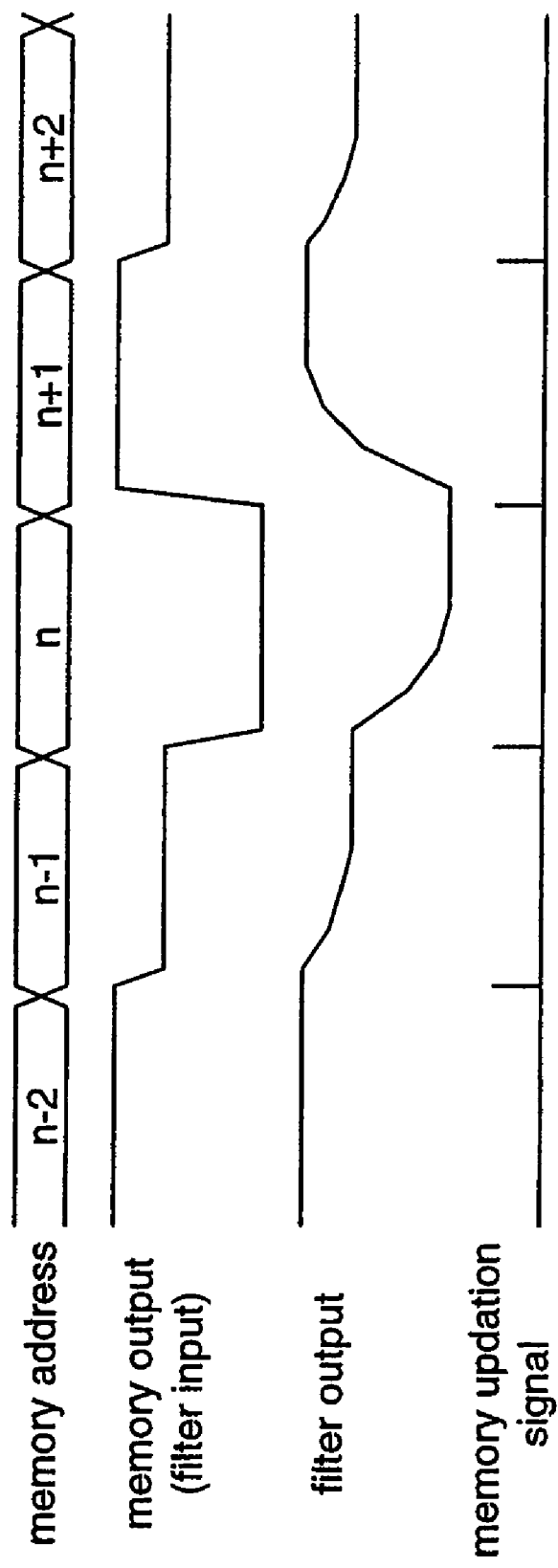
FIG. 10 is a waveform diagram for explaining the manner of data updation of the conventional memory.
Figure 11:
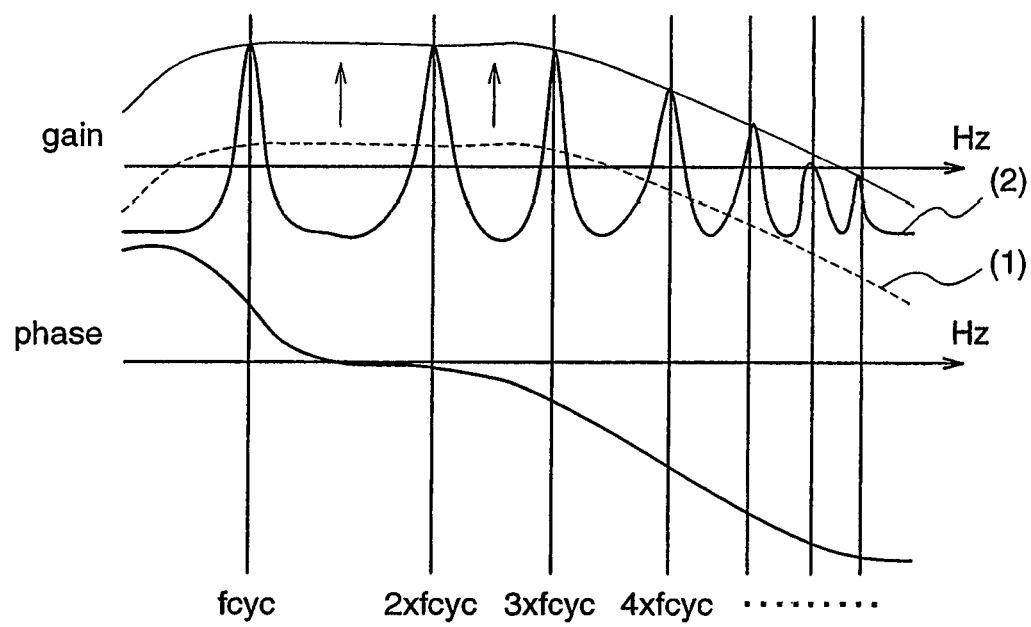
FIG. 11 is a diagram illustrating the characteristics of transfer function G in the case where the transfer function of the filter and the memory of the conventional repetitive control device is G.

FIG. 3(a) is a diagram illustrating the waveforms of signals outputted from the respective constituents of the conventional repetitive control device 11 shown in FIG. 8, while FIG. 3(b) is a diagram illustrating the waveforms of signals outputted from the respective constituents of the repetitive control device 11 according to the first embodiment of the present invention.

In FIG. 3, S1 shows the waveform of a driving signal required for disc following, which is outputted from the adder 2, S2 shows the waveform of a signal inputted to the adder 2 after the filtering process, and S3 shows the waveform of a compensated signal outputted from the servo filter 1. The waveform of the compensated signal S3 is determined by (S1-S2) as is apparent from FIG. 1.

Assuming that the output S3 from the servo filter 1 is A, the output S1 from the adder 2 is B, the input S2 to the adder 2 is C, and the transfer function of the filter 6 and the memory 7 is G, a relationship shown by the following formula (1) is established.

$$B = \frac{1}{1-G} \cdot A$$
$$A = (1-G) \cdot B$$
$$C = G \cdot B$$

As shown in FIG. 3(a), in the conventional optical disc device, since the filter 6 and the memory 7 are operated with the memory address switching frequency of the memory controller 8, a phase delay due to the filtering process occurs in the input S2 to the adder 2, which is outputted from the memory 7. Thereby, even when the output amplitude of the input S2 to the adder 2, which is outputted from the memory 7, is increased, the output S3 from the servo filter 1, which is determined by S3=S1−S2, cannot be made zero.

On the other hand, according to the first embodiment of the present invention, as shown in FIG. 2, the memory 7 of the repetitive control device 11 is used as a delay element for the low-pass filter 22 of the filter 6, and not the memory address switching frequency but a frequency that is equal to the operation frequency of the driving signal or a division frequency thereof is used as the driving frequency of the memory 7.

Thereby, several tens to several hundreds times of filtering processes are repeatedly carried out until the address of the memory 7 is changed by the memory controller 8, whereby an average of the driving signals that are outputted after the memory cell 7M is selected is written in the corresponding memory cell 7M of the memory 7. Therefore, as shown in FIG. 3(b), there occurs no phase delay due to the filtering process, in the input S2 to the adder 2 which is outputted from the memory 7.

Accordingly, the output S3 from the servo filter 1, which is determined by S3=S1−S2, can be made zero by increasing the output amplitude of the input S2 to the adder 2 which is outputted from the memory 7.

Figure 4:
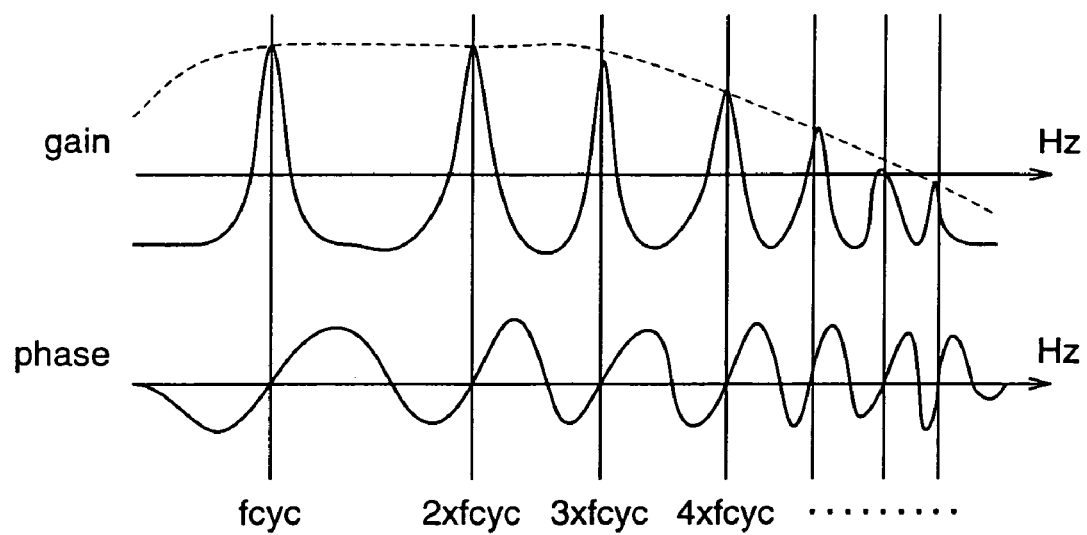
FIG. 4 is a diagram illustrating the characteristics of transfer function G in the case where the transfer function of the filter and the memory of the repetitive control device according to the first embodiment is G.

FIG. 4 is a diagram illustrating the characteristics of the transfer function G of the filter 6 and the memory 7 in the case where the repetitive control device 11 according to the first embodiment is used.

As shown in FIG. 4, with respect to the servo characteristics, the compensation gain at a frequency that is an integral multiple of the frequency corresponding to one rotation of the disc can be increased as in the conventional device, whereby the followability of the pickup 5 to the fluctuations in the track position which are caused by the shape of the disc can be improved.

Further, with respect to the phase characteristics, since the filter 6 using the memory 7 as a delay element serves as a comb filter, the phase rotation becomes zero at the peaks of the comb shape, thereby preventing occurrence of phase rotation during the filtering process.

As described above, according to the repetitive control device 11 of the first embodiment, the memory 7 is used as a delay element for the filter 6, and the filtering process is carried out using a clock signal that is an integral multiple of the operation frequency of the driving signal. Therefore, the compensation gain can be increased without generating phase rotation of the compensated signal, thereby achieving high followability to fluctuations in the track position which are caused by the shape of the disc, such as decentering and surface wobbling.

Further, according to the present invention, since the memory for the filter delay processing, which has conventionally been required, is dispensed with, the circuit scale can be reduced.

Embodiment 2

Next, a repetitive control device according to a second embodiment of the present invention will be described.

The repetitive control device according to the second embodiment includes a register that is connected in parallel with the memory 7 of the repetitive control device 11 according to the first embodiment, and higher-order bit data of an input signal are recorded into the memory 7 while lower-order bit data of the input signal are recorded into the register, during filtering by the filter 6.

Figure 5:
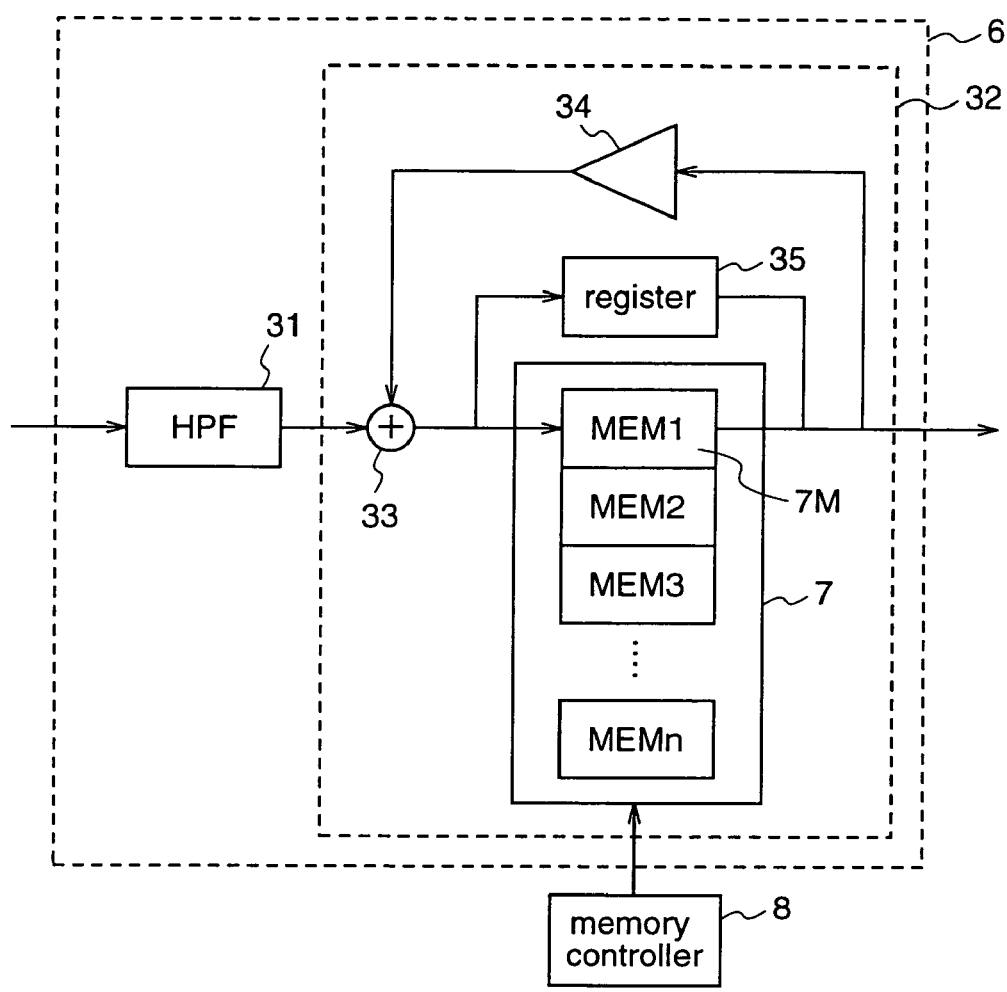
FIG. 5 is a block diagram illustrating the construction of a filter which has, as a delay element, a memory of a repetitive control device according to a second embodiment of the present invention.

FIG. 5 is a block diagram illustrating, in detail, a part of the repetitive control apparatus of the second embodiment where the memory 7 is a constituent of the filter 6. In FIG. 5, the filter 6 comprises a high-pass filter 31 and a low-pass filter 32, and the memory 7 and the register 35 are used as delay elements for the low-pass filter 32.

In FIG. 5, the high-pass filter 31 removes DC components. The adder 33, the memory 7, the feedback gain 34, and the register 35 constitute the low-pass filter 32, and the low-pass filter 32 removes noises and signals that exceed the control bandwidth of the repetitive control device. In the memory 7, 7M shows a memory cell that is currently selected by address control of the memory controller 8, and writing and reading of data are performed to this memory cell 7M.

The register 35 as well as the memory 7 constitute delay elements for the low-pass filter 32, and the memory cell 7M stores the higher-order data of the input signal data while the register 35 stores the lower-order data thereof.

In the above-mentioned repetitive control device according to the first embodiment, only the memory 7 functions as a delay element for the low-pass filter 22. However, when the cutoff frequency of the low-pass filter 22 is set at a low frequency, the word length of the data stored in the memory 7 as a delay element becomes extremely long, leading to an increase in the circuit scale of the memory 7.

Further, if the lower-order bits of the data are simply discarded to reduce the circuit scale, the accuracy of operation of the low-pass filter 32 is degraded, or the step response does not converge and shows vibrating response.

So, in the repetitive control apparatus according to the second embodiment of the invention, the word length of the data stored in the memory 7 is reduced, and the reduced portion is not discarded but is stored in the register 35 shown in FIG. 5, whereby filtering is carried out without reducing the word length of the data used for arithmetic processing. Therefore, the filter operation is stabilized and the precision is maintained, while suppressing an increase in the circuit scale of the memory 7.

The word length of the memory 7 that takes the higher-order bits is desired to be equal to at least the number of bits of the DA converter 3 to which the output of the memory 7 is applied. Thereby, the circuit scale of the memory can be reduced to the minimum, and further, the filter operation is stabilized, and the arithmetic precision is maintained.

Further, in the repetitive control device according to the second embodiment of the invention, as in the repetitive control device according to the first embodiment, the filtering process by the filter 6 is carried out using, not the memory address switching frequency, but a frequency equal to the operation frequency of the driving signal or a division frequency thereof. Therefore, the contents of the register 35 is updated by several tens to several hundreds times until the address of the memory 7 is changed by the memory controller 8, and the value of the register 35 converges to the original value, whereby influences on the repetitive control operation can be kept to the minimum.

As described above, in the repetitive control apparatus according to the second embodiment, the filter 6 includes the register 35 connected in parallel with the memory 7, and the higher-order bit data of the input signal are stored in the memory 7 while the lower-bit data are stored in the register 35 during the filtering process. Therefore, the circuit scale of the memory can be reduced to the minimum, and further, the filter operation is stabilized, and the arithmetic precision is maintained.

In, the first and second embodiments of the present invention, the filter 6 is constituted by a band-pass filter comprising a low-pass filter and a high-pass filter, and the memory 7 is used as a delay element for the low-pass filter. However, the construction of the filter 6 is not restricted to that mentioned above so long as the memory 7 is used as a delay element during the filtering process. For example, the filter 6 may be constituted by only a low-pass filter that uses the memory 7 as a delay element.

Embodiment 3

Next, a repetitive control device according to a third embodiment of the present invention will be described.

Figure 6:
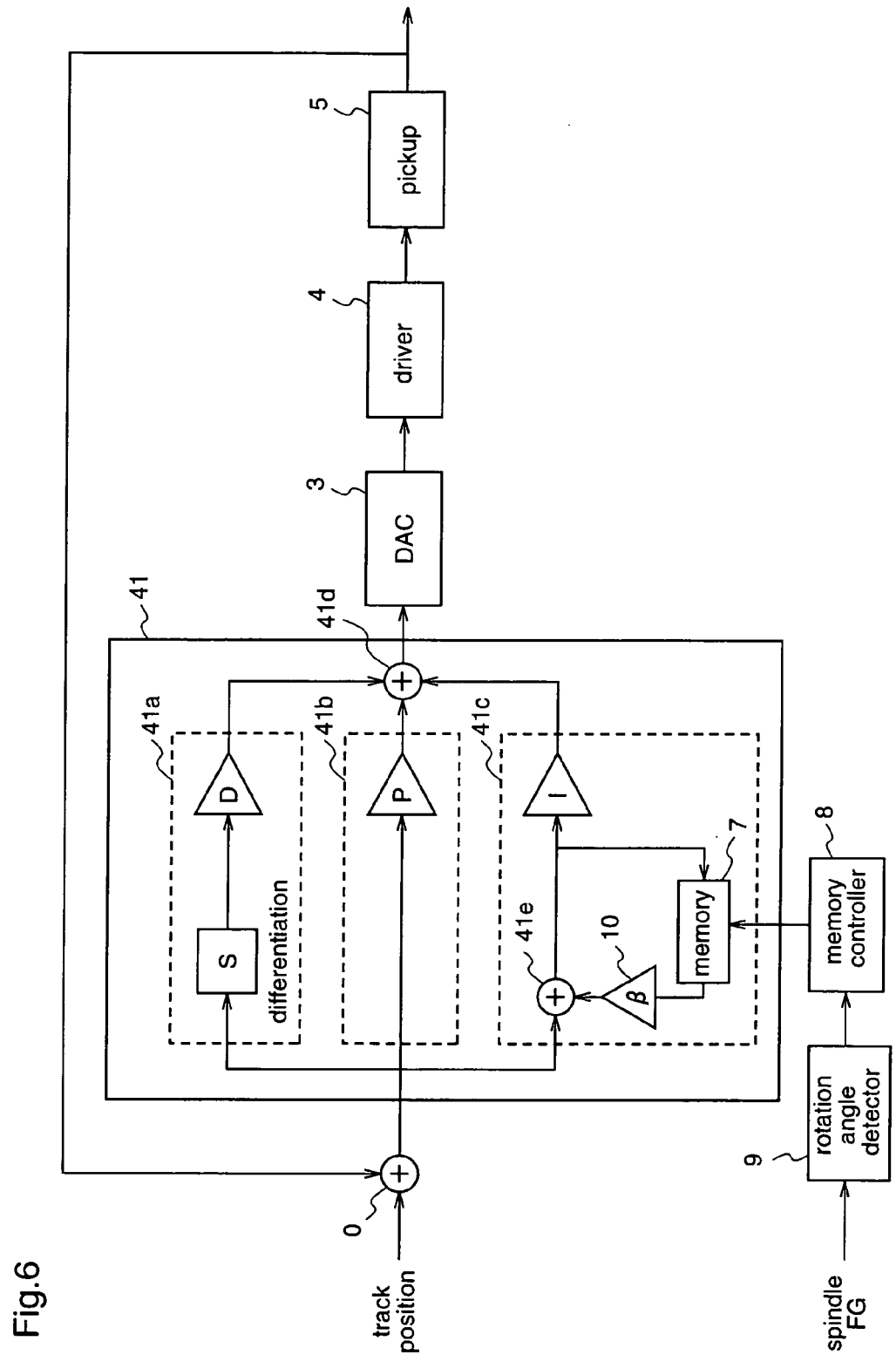
FIG. 6 is a block diagram for explaining a servo signal processing of an optical disc device according to a third embodiment of the present invention.

In the repetitive control device according to the third embodiment of the invention, an integral operation processing to be performed by an integral term operation part of a servo filter is carried out using a memory in which signal information for one rotation of a disc is divided to be stored in plural memory areas. FIG. 6 is a block diagram for explaining a servo signal processing of the optical disc device according to the third embodiment of the present invention.

In FIG. 6, the optical disc device according to the third embodiment comprises an adder 0, a servo filter 41, an adder 2, a DAC 3, a driver 4, a pickup 5, a memory controller 8, and a rotation angle detector 9. The optical disc device according to the third embodiment uses the memory 7 as a delay element for the integral term operation part of the servo filter 41, and the same constituents as those of the conventional optical disc device shown in FIG. 8 are given the same reference numerals to omit description thereof.

The servo filter 41 comprises a differential term operation part 41a, a proportional term operation part 41b, an integral term operation part 41c, and an adder 41d for adding the outputs from the differential term operation part 41a, the proportional term operation part 41b, and the integral term operation part 41c.

The differential term operation part 41a performs proportional control for a positional error signal outputted from the adder 0, and the proportional term operation part 41b performs proportional control for the positional error signal outputted from the adder 0.

The integral term operation part 41c performs integral control for the positional error signal outputted from the adder 0, and comprises an adder 41e for adding the positional error signal outputted from the adder 0 and the feedback signal outputted from a memory 7, the memory 7 having plural memory areas, wherein signal information for one rotation of the disc is divided to be stored in the respective memory areas, a gain 10, and an integral gain.

Next, the operation of the repetitive control device according to the third embodiment of the present invention will be described.

When a servo error signal indicating a positional error of a focal point of a light beam with respect to a track position is supplied from the adder 0 to the integral term operation part 41c, the integral term operation part 41c performs integration using a memory cell selected by the memory controller 8.

This integration is carried out with a frequency equal to the operation frequency of the driving signal or a division frequency thereof, whereby several tens to several hundreds of processes are repeatedly carried out to the same memory cell 7M until the memory address is changed by the control signal from the memory controller 8 and thereby aliasing noises can be removed.

Then, the address of the memory 7 is changed by the memory controller 8 according to the rotation of the disc, whereby the low-pass components of the servo control signals corresponding to the respective disc rotation angles are successively stored in the plural memory cells, and simultaneously, successively outputted from the memory cells.

Thereby, the servo error signals corresponding to displacements of the respective positions on the disc can be stored and outputted over a broad bandwidth, and further, a phase delay in the integration process is resolved to improve the loop phase characteristics.

FIG. 7 is a waveform diagram illustrating the gain and phase characteristics obtained in the integral term operation part of the repetitive control device according to the third embodiment of the present invention.

Figure 7A:
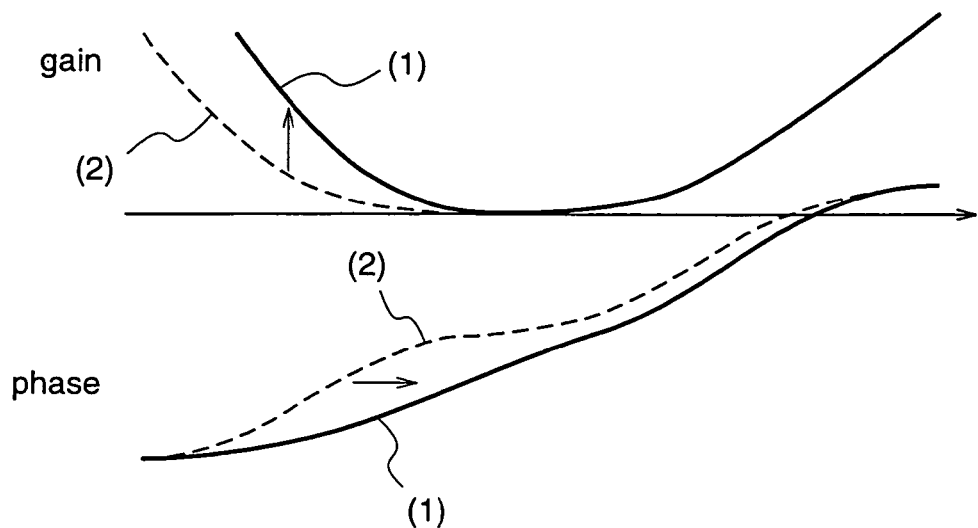
FIG. 7(a) is a waveform diagram illustrating gain characteristics and phase characteristics which are obtained by a conventional integral term operation unit.
Figure 7B:
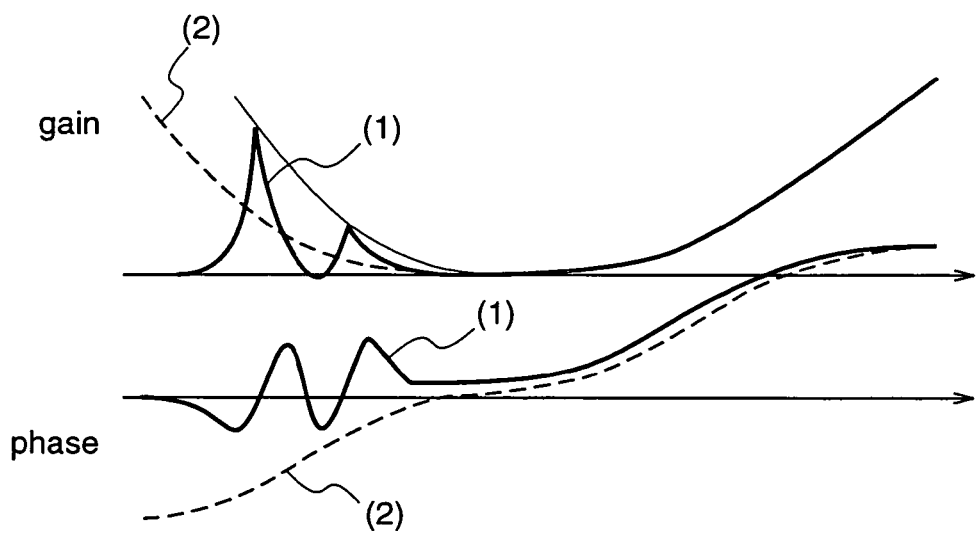
FIG. 7(b) is a waveform diagram illustrating gain characteristics and phase characteristics which are obtained by an integral term operation unit according to the third embodiment of the present invention.

FIG. 7(a) is a diagram illustrating the gain characteristics and the phase characteristics obtained in the conventional integral term operation part, and FIG. 7(b) is a diagram illustrating the gain characteristics and the phase characteristics obtained in the integral term operation part according to the third embodiment. In the figures, dotted lines (2) indicate the gain and phase characteristics of the servo filter after modification, and solid lines (1) indicate the gain and phase characteristics in the case where the gain of the integral term is increased.

As shown in FIG. 7(a), during the integration performed by the conventional integral term operation part, a phase delay occurs when the gain of the integral term is increased, thereby adversely affecting the followability to the track.

On the other hand, the low-pass gain of the signal that is processed by the integral term operation part using the repetitive control device according to the third embodiment can be increased without a phase delay.

As described above, in the repetitive control device according to the third embodiment of the invention, the integral operation processing to be performed by the integral term operation part of the servo filter is performed using the memory in which signal information for one rotation of the disc is divided to be stored in plural memory areas. Therefore, the gain at the frequency synchronized with the rpm of the disc in the servo error signal can be made equal to the DC gain of the integral term without generating a phase delay, whereby a PID filter having a high low-pass gain can be realized without adversely affecting the servo characteristics.

APPLICABILITY IN INDUSTRY

A repetitive control device according to the present invention enables an increase in gain without generating phase rotation in an input signal, and it is very useful in processing a servo signal.

The invention claimed is:

1. A repetitive control device comprising:
   an adder to which a compensated signal is inputted;
   a feedback signal system for sequentially updating and storing an output signal from the adder, and outputting the signal to the adder;
   said feedback signal system comprising,
   a filter which has, as a delay element, a memory which stores signal information for one rotation of a disc into divided plural memory areas of the memory,
   a gain element which multiplies an output from the filter by a value not larger than 1, and inputs the result to the adder, and said filter being operated using a clock signal that is equal to an operation frequency of a driving signal, or a divided frequency thereof, wherein the driving signal corresponds to the compensated signal.

2. A repetitive control device as defined in claim 1 wherein said filter has a register connected in parallel with the memory, and records higher-order bit data of an input signal in the memory while records lower-order bit data in the register, during a filtering process by the filter.

3. A repetitive control device as defined in claim 2 wherein a word length of the higher-order bit data recorded in the memory is equal to a word length of data of the compensated signal that is added in the adder, or a word length of a DA converter to which the output of the adder is inputted.

4. A repetitive control device as defined in claim 1 wherein said filter includes a low-pass filter, and uses said memory as a delay element for the low-pass filter.

5. A repetitive control device as defined in claim 1 wherein said filter is a band-pass filter comprising a low-pass filter and a high-pass filter, and uses said memory as a delay element for the low-pass filter.

6. An optical disc device performing recording or playback of an optical disc, which is equipped with a repetitive control device as defined in claim 1.

7. A repetitive control device including an integral term operation part of a PID servo filter, which performs an arithmetic processing using a clock signal that is equal to an operation frequency of a driving signal outputted from the PID servo filter, or a divided frequency thereof, said integral term operation part comprising:

an adder to which a servo error signal is inputted; and a feedback signal system for sequentially updating an output signal from the adder and inputting the signal to the adder; and said feedback signal system comprising, a memory in which signal information for one rotation of a disc is divided to be stored in plural memory areas, and a gain element which multiplies an output from the memory by a value not larger than 1, and inputs the result to the adder, wherein, when performing an integral operation to the inputted servo error signal, the integral operation uses the memory as a delay element for the input signal.

8. An optical disc device performing recording or playback of an optical disc, which is equipped with a repetitive control device as defined in claim 7.

* * * * *